(12) United States Patent
Lee

(10) Patent No.: US 10,567,737 B2
(45) Date of Patent: Feb. 18, 2020

(54) DEPTH INFORMATION PROCESSING DEVICE CAPABLE OF INCREASING ACCURACY OF DEPTH INFORMATION IN SPECIFIC REGIONS

(71) Applicant: eYs3D Microelectronics, Co., Taipei (TW)

(72) Inventor: Chi-Feng Lee, Hsinchu County (TW)

(73) Assignee: eYs3D Microelectronics, Co., Taipei (TW)

(*) Notice: Subject to any disclaimer, the term of this patent is extended or adjusted under 35 U.S.C. 154(b) by 182 days.

(21) Appl. No.: 15/950,120

(22) Filed: Apr. 10, 2018

(65) Prior Publication Data

US 2018/0295345 A1  Oct. 11, 2018

Related U.S. Application Data

(60) Provisional application No. 62/483,472, filed on Apr. 10, 2017.

(51) Int. Cl.
| | |
|---|---|
| *H04N 13/239* | (2018.01) |
| *G06T 7/593* | (2017.01) |
| *H04N 13/271* | (2018.01) |
| *G06T 7/70* | (2017.01) |
| *H04N 13/366* | (2018.01) |
| *G06F 3/0346* | (2013.01) |
| *G06T 3/40* | (2006.01) |
| *H04N 13/00* | (2018.01) |
| *G06T 19/00* | (2011.01) |

(52) U.S. Cl.
CPC ......... *H04N 13/239* (2018.05); *G06F 3/0346* (2013.01); *G06T 3/40* (2013.01); *G06T 7/593* (2017.01); *G06T 7/70* (2017.01); *H04N 13/271* (2018.05); *H04N 13/366* (2018.05); *G06T 19/006* (2013.01); *G06T 2207/10012* (2013.01); *G06T 2207/10028* (2013.01); *H04N 2013/0081* (2013.01)

(58) Field of Classification Search
CPC .................................................... H04N 13/239
USPC ............................................................ 348/47
See application file for complete search history.

(56) References Cited

U.S. PATENT DOCUMENTS

| | | | | |
|---|---|---|---|---|
| 2012/0274747 | A1* | 11/2012 | Yasuda | H04N 13/128 348/51 |
| 2015/0098509 | A1* | 4/2015 | Sung | H04N 19/597 375/240.16 |

FOREIGN PATENT DOCUMENTS

| | | |
|---|---|---|
| CN | 102364524 A | 2/2012 |
| CN | 103903262 A | 7/2014 |

\* cited by examiner

*Primary Examiner* — Yulin Sun
(74) *Attorney, Agent, or Firm* — Winston Hsu

(57) ABSTRACT

A depth information processing device includes a first image capturing device, a second image capturing device, and a processor. The first image capturing device captures a reference image, and the second image capturing device captures a target image. The processor is coupled to the first image capturing device and the second image capturing device. The processor selects a reference block from the reference image, selects a plurality of target blocks corresponding to the reference block from the target image with different sample periods, and generates the depth information according to the reference block and a selected target block of the plurality of target blocks.

16 Claims, 7 Drawing Sheets

DEPTH INFORMATION PROCESSING DEVICE CAPABLE OF INCREASING ACCURACY OF DEPTH INFORMATION IN SPECIFIC REGIONS

CROSS REFERENCE TO RELATED APPLICATIONS

This non-provisional application claims priority of U.S. provisional application U.S. Ser. No. 62/483,472, filed on Apr. 10, 2017, included herein by reference in its entirety.

BACKGROUND OF THE INVENTION

1. Field of the Invention

This invention is related to a depth processing device, and more particularly, a depth processing device capable of increasing accuracy of depth information in a specific region or reducing the number of comparisons while preserving acceptable accuracy.

2. Description of the Prior Art

As the demand for all kinds of applications on electronic devices increases, deriving the depth information for exterior objects has become a required function for many electronic devices. For example, once the depth information of the external objects, that is, the information about the distances between the objects and the electronic device, is obtained, the electronic device can identify objects, combine images, or implement different kinds of applications according to the depth information. Binocular vision, structured light, and time of flight (ToF) are a few common ways to derive depth information nowadays.

FIG. 1 shows a depth processing device 100 of prior art. In FIG. 1, after calibration, the depth processing device 100 can capture images with the first image capturing device 110 and the second image capturing device 120. Since the image capturing devices 110 and 120 are at different positions, the images captured by these two devices would also be different and can be seemed as a left-eye image and a right-eye image. For example, when using the image capturing devices 110 and 120 to capture the objects A and B, the positions of the objects A and B in the images captured by the image capturing devices 110 and 120 would be different since the distances between the objects A and B to the image capturing devices 110 and 120 are different. In FIG. 1, the position of the object A is shallower than the position of the object B, that is, the object A is closer to the image capturing devices 110 and 120 than the object B. In this case, the object A would be at left side of the image captured by the image capturing device 110 and at the right side of the image captured by the image capturing device 120. However, the object B would be near the center of the image captured by the image capturing device 110 and near the center of the image captured by the image capturing device 120.

In other words, when the depth of the object is shallower, its related positions between the images captured by the image capturing devices 110 and 120 would be farer apart, that is, with a greater disparity. However, when the depth of the object is deeper, its related positions between the images captured by the image capturing devices 110 and 120 would be closer, that is, with a smaller disparity. By searching the objects A and B in the images captured by the image capturing devices 110 and 120 to obtain the positions and the disparities of the objects A and B, the depth processing device 100 can calculate the depth information of the objects A and B with mathematical methods, such as triangulation, according to the distance between the image capturing devices 110 and 120, that is, the length of the baseline, the field of views, and other relevant parameters.

However, generally, when the triangulation is applied, the greater the actual depth of the object, the lower the accuracy can be obtained. FIG. 2 shows the relation between the disparity of the objects in the two images and the actual depth. In FIG. 2, the disparities d1 and d2 are corresponding to the actual distances z1 and z2 respectively, and the disparities d3 and d4 are corresponding to the actual distances z3 and z4 respectively. According to FIG. 2, when the disparity is smaller (such as d1 and d2), the corresponding distance of the object is greater, that is, the position of the object is deeper (such as z1 and z2), and the corresponding range of possible distances is wider, resulting in a lower accuracy. However, when the disparity is greater (such as d3 and d4), the corresponding distance of the object is smaller, that is, the position of the object is shallower (such as z3 and z4), and the corresponding range of possible distances is narrower, resulting in a higher accuracy.

In prior art, to improve the accuracy of the depth information, higher resolution is required to obtain a more accurate disparity, the distance between the image capturing devices has to be increased, or the field of views of the image capturing devices 110 and 120 has to be narrowed. However, all these approaches either require significant computation resources from the system or strictly limit the effective range of the depth information.

SUMMARY OF THE INVENTION

One embodiment of the present invention discloses a depth information processing device. The depth information processing device includes a first image capturing device, a second image capturing device, and a processor.

The first image capturing device captures a reference image, and the second image capturing device captures a target image. The processor is coupled to the first image capturing device and the second image capturing device. The processor selects a reference block from the reference image, selects a plurality of target blocks corresponding to the reference block from the target image with different sample periods, and generates the depth information according to the reference block and a selected target block of the plurality of target blocks.

Another embodiment of the present invention discloses a depth information processing device. The depth information processing device includes a first image capturing device, a second image capturing device, and a processor.

The first image capturing device captures a reference image, and the second image capturing device captures a target image. The processor is coupled to the first image capturing device and the second image capturing device. The processor selects a reference block from the reference image, selects a plurality of target blocks corresponding to the reference block from the target image, and generates the depth information according to the reference block and a selected target block of the plurality of target blocks. A first sample period of a first set of target blocks of the plurality of target blocks is different from a second sample period of a second set of target blocks of the plurality of target blocks.

Another embodiment of the present invention discloses a depth information processing device. The depth information processing device includes a first image capturing device, a second image capturing device, and a processor.

The first image capturing device captures a reference image, and the second image capturing device captures a target image. The processor is coupled to the first image capturing device and the second image capturing device. The processor selects a reference block from the reference image, selects a plurality of target blocks corresponding to the reference block from the target image, and generates the depth information according to the reference block and a selected target block of the plurality of target blocks. A sample period of a predetermined set of target blocks of the plurality of target blocks is smaller than sample periods of other sets of target blocks of the plurality of target blocks.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
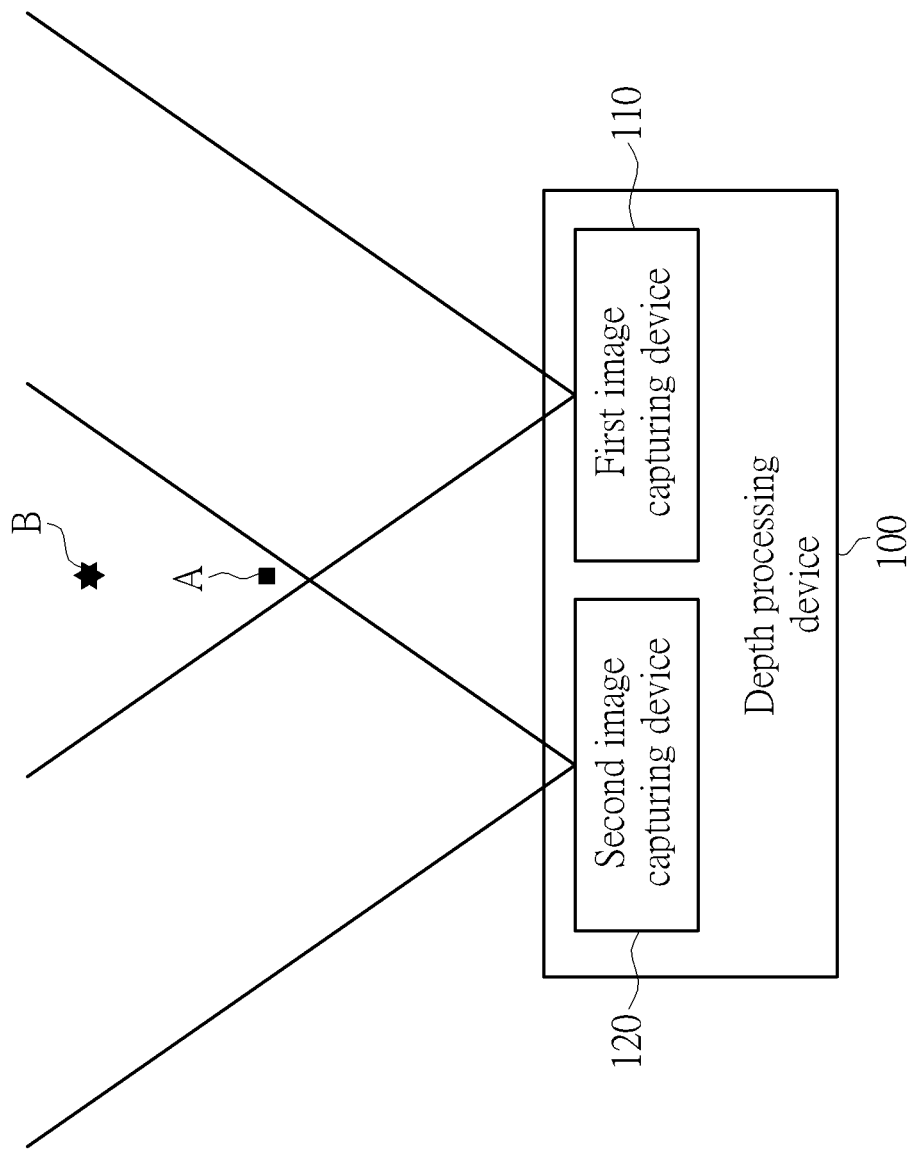
FIG. 1 shows a depth processing device of prior art.
Figure 2:
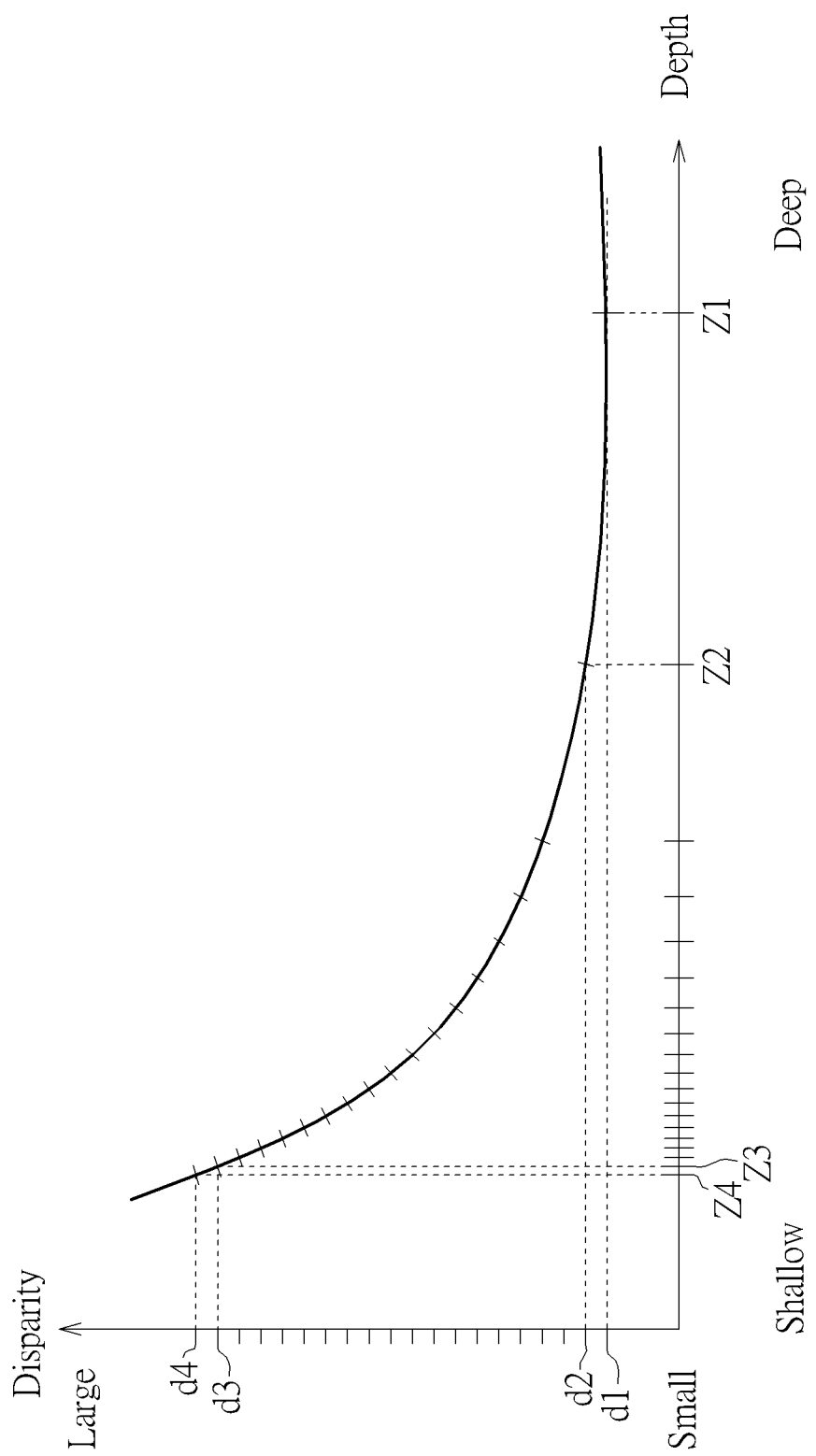
FIG. 2 shows the relation between the disparity of the objects in the two images and the actual depth.
Figure 3:
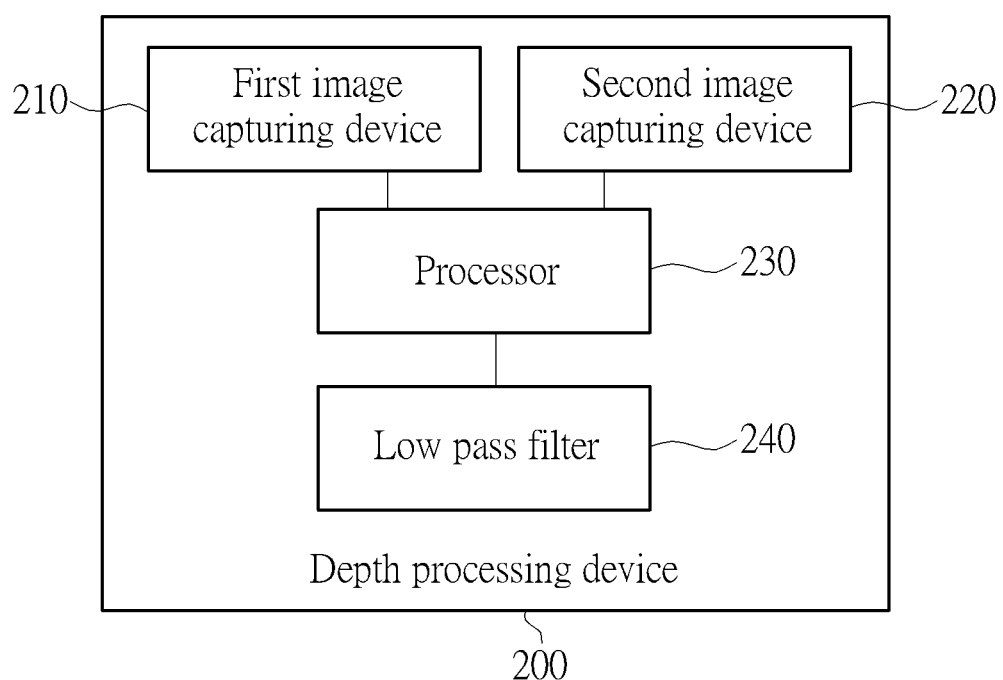
FIG. 3 shows a depth processing device according to one embodiment of the present invention.

FIG. 3 shows a depth processing device 200 according to one embodiment of the present invention. The depth processing device 200 includes a first image capturing device 210, a second image capturing device 220, and a processor 230.

Figure 4:
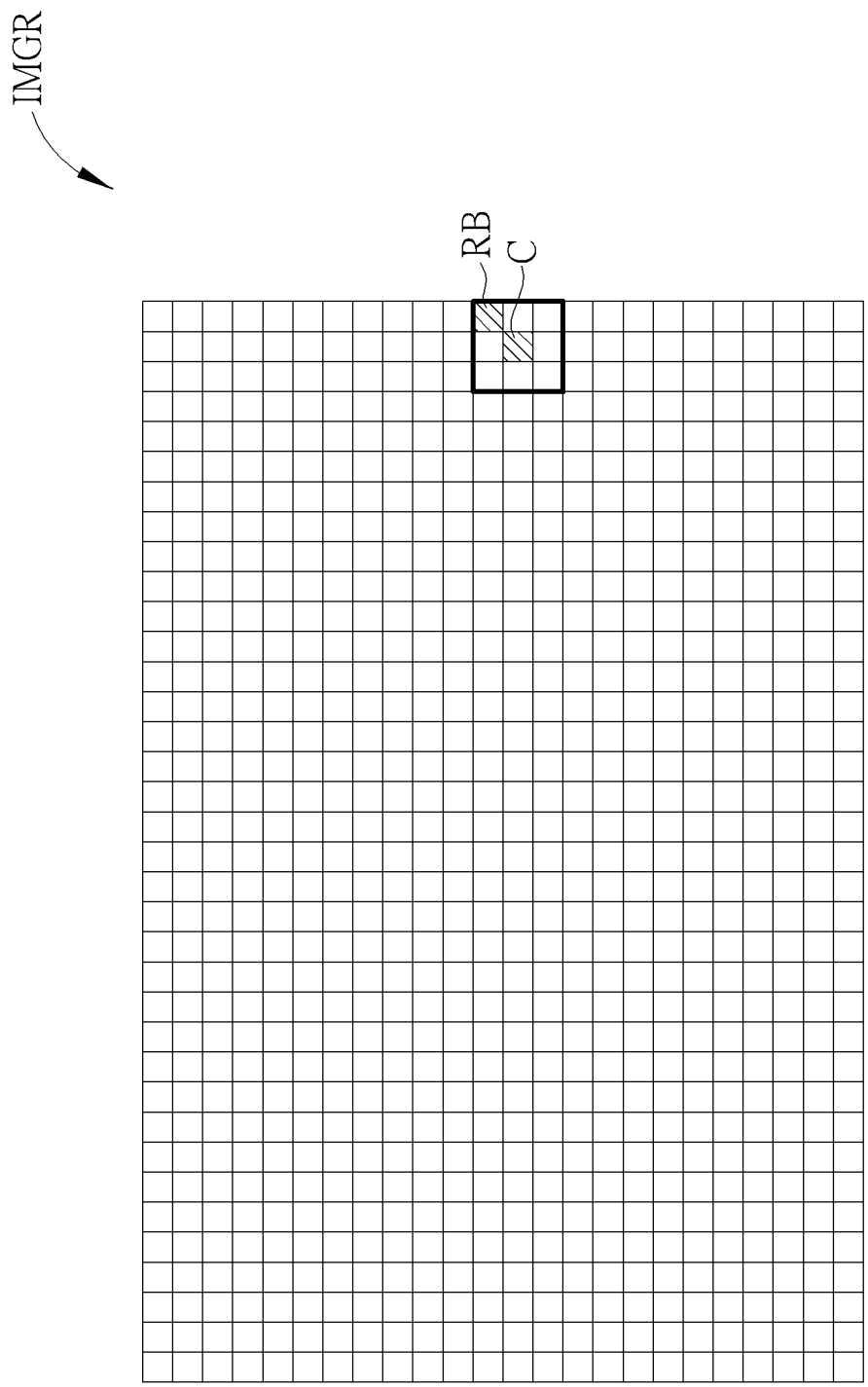
FIG. 4 shows a reference image according to one embodiment of the present invention.
Figure 5:
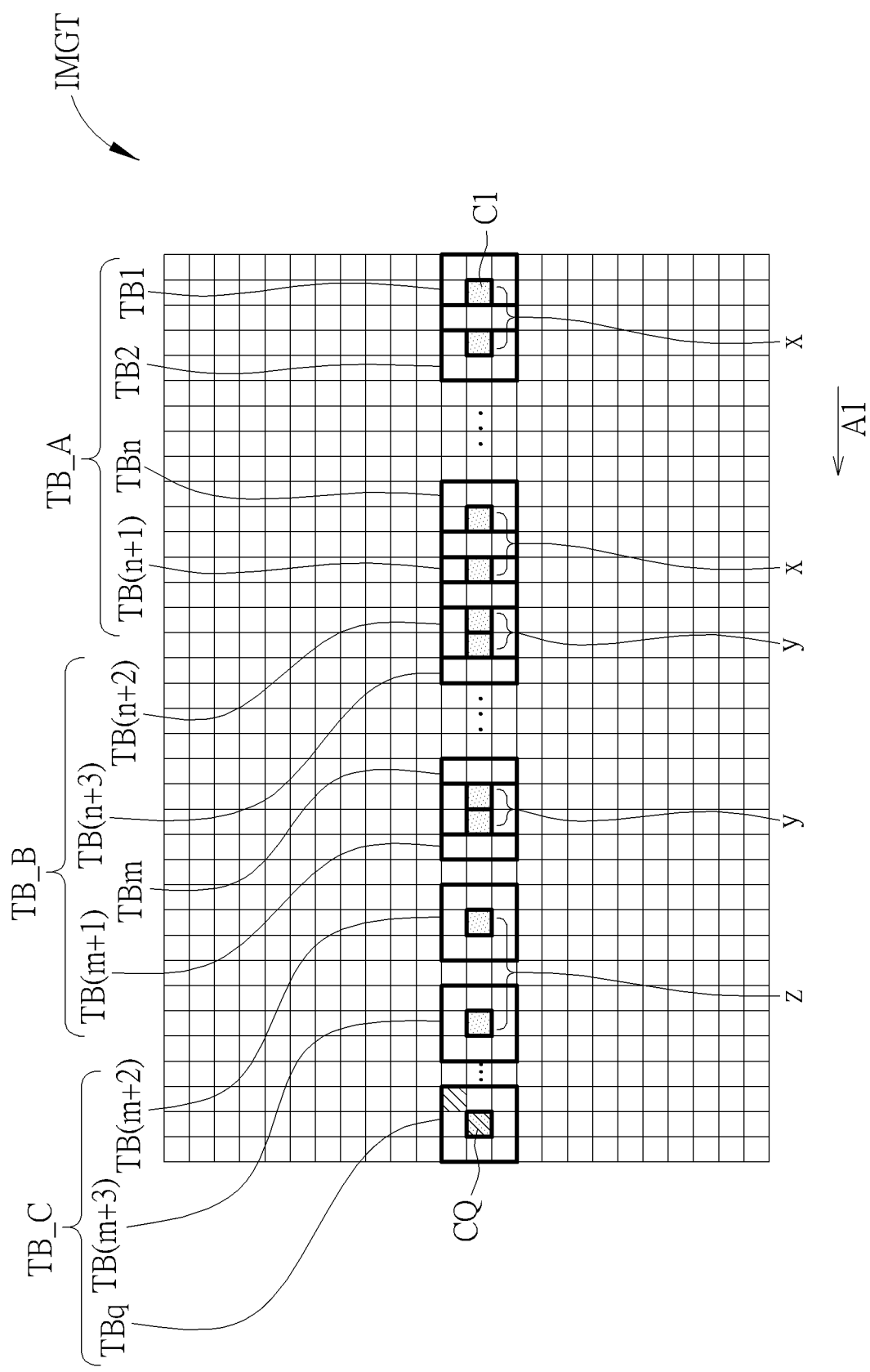
FIG. 5 shows a target image according to one embodiment of the present invention.

The first image capturing device 210 can capture a reference image, and the second image capturing device 220 can capture a target image. FIG. 4 shows a reference image IMGR according to one embodiment of the present invention, and FIG. 5 shows a target image IMGT according to one embodiment of the present invention. In some embodiments, the target image IMGT and the reference image IMGR can use the same units to help the processor 230 for comparing the target image IMGT and the reference IMGR and searching the same object in the target image IMGT and the reference image IMGR.

For example, the processor 230 can select a reference block RB from the reference image IMGR for calculating the depth information of the object C represented by the center pixel of the reference block RB. Later, corresponding to the reference block RB, the processor 230 can select a plurality of target blocks TB1 to TBq along a comparison direction A1 in the target image IMGT. For example, the processor 230 can select a first target block TB1 with the same size as the reference block RB from the target image IMGT at the same relative position as of the reference block RB in the reference image IMGR, and move along the comparison direction A1 to select the rest of target blocks TB2 to TBq.

In FIG. 5, after calibration, the images captured by the first image capturing device 210 and the second image capturing device 220 can be on the same plane, and the connecting line between the first image capturing device 210 and the second image capturing device 220, that is, the baseline can be parallel to the horizontal direction. In this case, the comparison direction A1 will also be parallel to the horizontal direction, and the relative position of the first target block TB1 in the target image IMGT would be the same as the relative position of the reference block RB in the reference image IMGR. In FIG. 5, although the comparison direction A1 is from the right to the left, this is not to limit the present invention. In other embodiments, the comparison direction A1 may be from the left to the right. In addition, according to the installment direction of the first image capturing device 210 and the second image capturing device 220, the comparison direction A1 can also be parallel to the vertical direction or other directions instead of the horizontal direction.

In some embodiments, when comparing the reference block RB with each of the target blocks TB1 to TBq, the processor 230 can derive the features of each block according to the system requirement as the comparing bases. For example, the features can be the color histogram, the edge distribution, etc. The processor 230 can select the target block from the target blocks TB1 to TBq with features most similar to the reference block RB to be the selected target block. That is, the selected target block is the target block best matching with the reference block RB. When the processor 230 obtains the selected target block best matching with the reference block RB, for example, the target block TBq, it means that the object C may show up in the object block TBq. In this case, the processor 230 would generate the depth information according to the reference block RB and the selected target block. For example, the processor 230 can take the distance between the center pixel CQ of the target block TBq and the center pixel C1 of the target block TB1 as the disparity of the object C between the first image capturing device 210 and the second image capturing device 220, where the distance can be estimated by the number of pixels between the two center pixels. Consequently, the processor 230 can generate the depth information of the object C according to the disparity of the object C between the first image capturing device 210 and the second image capturing device 220, and the relevant parameters of the first image capturing device 210 and the second image capturing device 220, such as the length of the baseline, the viewing angles, and the focal lengths.

Figure 6:
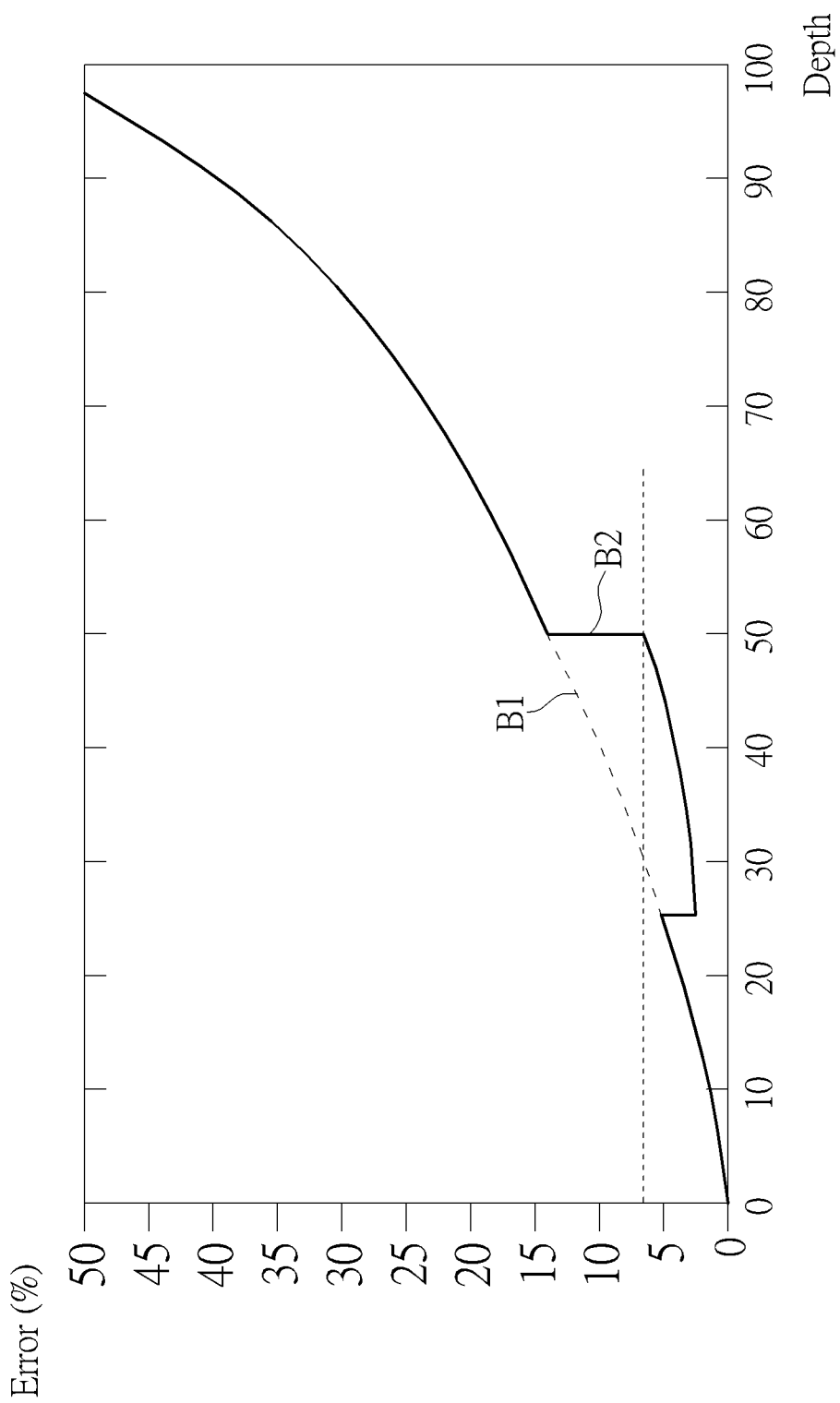
FIG. 6 shows the relation between the errors and the depths generated by the depth processing devices in FIGS. 1 and 3.

FIG. 6 shows the relation between the errors and the depths generated by the depth processing devices 100 and 200, and the values of depth can be relative values without limited by any units. The dash line B1 can represent the relation between the errors and the depths generated by the depth processing device 100. In some embodiments, the depth information with great errors can affect the result of the following application so the system can determine that the depth information with errors smaller than a predetermined threshold to be effective depth information and can be used by the following applications. Oppositely, the depth information with errors greater than the predetermined threshold may be used for reference only. In this case, if the predetermined error threshold required by the system is 7%, then the depth processing device 100 can actually use the depth information for objects with depth values smaller than 30 since the objects with depth values over 30 all have errors greater than 7% on the dash line B1 shown in FIG. 6.

Furthermore, in FIG. 6, when the depths of the objects are smaller, for example, with depth values between 0 and 20, the depth values derived by depth processing device 100 would be more accurate. In this case, the accuracy of the depth information can meet the system requirement even without with the depth processing device 100 to perform a further process. However, when the depths of the objects are greater, for example, with depth values between 60 and 100, the depth values derived by depth processing device 100 would be more inaccurate. In this case, since the errors are rather large, the accuracy of the depth information will fail to meet the system requirement even if the depth processing device 100 performs a further process.

In other words, for the objects with depth values between 0 and 20 or between 60 and 100, whether to increase the resolution and increase the number of comparisons (by reducing the sample period or increasing the sample frequency) will not help to reduce the errors to meet the target error threshold of 7%. Therefore, the depth processing device 200 can increase the resolution, reduce the sample period to increase the depth accuracy for objects with depth values between 25 and 50, and reduce the number of comparisons for objects with depth values between 0 and 20 or between 60 and 100. Consequently, the total number of comparisons will not be increased or will lower than a theoretical value while the depth accuracy of the objects with depth values between 25 and 50 can be improved, allowing the depth processing device 200 to provide effective depth information for objects with depth values of 50. Here, the theoretical value can be deemed as the comparison number required when the resolution is increased and the sample frequency is increased correspondingly.

In FIG. 6, the solid line B2 can represent the relation between the errors and the depths generated by the depth processing device 200. To improve the accuracy of the depth processing device 200, the depth processing device 200 can use the image capturing devices 210 and 220 with higher resolution for increasing the resolution of the reference image IMGR and increasing the resolution of the target image IMGT to the same level as the reference image IMGR in the present embodiment. In prior art, when the resolution is raised, although the accuracy of the depth processing device 100 can be raised, it will also require more numbers of comparisons to maintain the same working range. For example, when the resolutions along the horizontal directions of the reference image IMGR and the target image IMGT are raised to two times higher in prior art, meaning the number of pixels along the horizontal directions is doubled, if the depth processing device 100 selects the target blocks along the horizontal direction by a fixed interval of pixels, then the number of comparisons for the depth processing device 100 will also be doubled to maintain the same working range, causing burdens to the whole system and increasing the time or cost for generating the depth information significantly.

However, in the embodiment of FIG. 5, when selecting the target blocks, the processor 230 can adjust the sample period between the current target block and the next target block according to the current correspondent disparity. That is, in a series of target blocks TB1 to TBq selected by the processor 230, a pixel step length between two adjacent target blocks can be different from a pixel step length between another two adjacent target blocks.

For example, the target blocks TB1 to TBq can include a first set of target blocks TB_A and a second set of target blocks TB_B. The first set of target blocks TB_A can include a first target block TB1 to an $(n+1)^{th}$ target block TB(n+1). Since the disparities corresponding to the first target block TB1 to the $(n+1)^{th}$ target block TB(n+1) are rather small, the correspondent depth values would be rather large, for example, it may correspond to objects with depth values between 50 and 100. In this case, since the depth values corresponding to the objects in the first target block TB1 to the $(n+1)^{th}$ target block TB(n+1) are rather large, the errors produced by the depth processing device 200 can also be large. Therefore, even with the selection of the target blocks TB1 to TB (n+1) to be performed properly (with a smaller sample period), the errors produced by the depth processing device 200 may still not be able to meet the predetermined threshold of 7% required by the system. Therefore, when selecting the first target block TB1 to the $(n+1)^{th}$ target block TB (n+1), the depth processor 230 can perform with the sample period being x pixels. That is, in the first set of target blocks TB_A, the pixel step length between two adjacent target blocks is x pixels, and x can be, for example but not limited to, 2. For example, along the comparison direction A1, the processor 230 can select the second pixel next to the center pixel C1 of the first target block TB1 to be the center pixel of the second target block TB2, and select the second pixel next to the center pixel of the $n^{th}$ target block TBn to be the center pixel of the $(n+1)^{th}$ target block TB (n+1), where n is greater than 1.

In other words, although the resolutions along the horizontal directions of the reference image IMGR and the target image IMGT are doubled, for objects with depth values between 50 and 100, the errors produced by the depth processing devices 100 and 200 would be very close since the processor 230 can select the target blocks with sample period of 2 pixels. Therefore, in FIG. 6, in the region of depth values between 50 and 100, the solid line B2 would coincide with the dash line B1.

Contrarily, the second set of target blocks TB_B can include an $(n+2)^{th}$ target block TB(n+2) to an $(m+1)^{th}$ target block TB(m+1). Since the disparities corresponding to the $(n+2)^{th}$ target block TB (n+2) to the $(m+1)^{th}$ target block TB (m+1) are a bit larger, the correspondent depth values may be smaller than the depth values corresponding to the first set of target blocks TB_A, and may be between 25 and 50, where m is greater than (n+2). In this case, since the errors produced by the depth processing device 200 when calculating the depth information of the object with depth values over 30 may excess 7%, the processor 230 can select the $(n+2)^{th}$ target block TB (n+2) to the $(m+1)^{th}$ target block TB(m+1) with the sample period being y pixels. That is, in the second set of target blocks TB_B, the pixel step length between two adjacent target blocks is y pixels, and y can be, for example but not limited to, 1. For example, along the comparison direction A1, the processor 230 can select the first pixel next to the center pixel of the $(n+2)^{th}$ target block TB (n+2) to be the center pixel of the $(n+3)^{th}$ target block TB (n+3), and select the first pixel next to the center pixel of the $(m)^{th}$ target block TBm to be the center pixel of the $(m+1)^{th}$ target block TB(m+1).

In other words, since the processor 230 can select the $(n+2)^{th}$ target block TB (n+2) to the $(m+1)^{th}$ target block TB (m+1) in the second set of target blocks TB_B with the sample period of 1 pixel, the accuracy of the depth information can be improved. In FIG. 6, on the solid line B2 corresponding to the depth processing device 200, for objects with depth values between 25 and 50, the errors produced by the depth processing device 200 would be smaller than the errors produced by the depth processing device 100, and may be even smaller than the predetermined threshold of 7% required by the system, meeting the requirement.

That is, the depth processing device 200 can select the target blocks TB1 to TB(n+1) corresponding to larger errors with a greater sample period, and can select the target blocks TB(n+2) to TB(m+1) corresponding to errors close to the error threshold with a smaller sample period. Consequently, without increasing the total number of comparisons or with the total number of comparisons being lower than theoretical value, the depth processing device 200 can provide the effective depth information for the objects with the depth values smaller than 50. Contrarily, the depth processing device 100 can only provide effective depth information for objects with depth values smaller than 30.

In addition, the target block TB1 to TBq can further include a third set of target blocks TB_C. The third set of target blocks TB_C can include an $(m+2)^{th}$ target block TB(m+2) to a $q^{th}$ target block TBq. Since the disparities corresponding to the $(m+2)^{th}$ target block TB (m+2) to the $q^{th}$ target block TBq are rather large, the correspondent depth values may be smaller than the depth values corresponding to the second set of target blocks TB_B, and may be smaller than 25. In this case, since the error produced by the depth processing device 200 when calculating the depth of the object with depth values smaller 25 can be much smaller than 7%, the processor 230 can select the (m+2) th target block TB(m+2) to the $q^{th}$ target block TBq with a greater sample period while the produced error can still be below 7% as required by the system. Therefore, it is not necessary for the processor 230 to sample the target blocks with a small sample period. Instead, the processor 230 can select the $(m+2)^{th}$ target block TB(m+2) to the qth target block TBq with the sample period being z pixels. That is, in the third set of target blocks TB_C, the pixel step length between two adjacent target blocks is z pixels, and z can be, for example but not limited to, 4. For example, along the comparison direction A1, the processor 230 can select the fourth pixel next to the center pixel of the $(m+2)^{th}$ target block TB(m+2) to be the center pixel of the $(m+3)^{th}$ target block TB(m+3).

In other words, although the resolutions along the horizontal directions of the reference image IMGR and the target image IMGT are doubled, in FIG. 6, on the solid line corresponding to the depth processing device 200, for objects with depth values between 0 and 25, the errors produced by the depth processing device 200 would actually be greater than the errors generated by the depth processing device 100 since the depth processing device 200 can select the target blocks TB(m+1) to TBq with the sample period of 4 pixels.

In some embodiments, the depth processing device 200 can also select the values x, y and z of the sample periods according to the system requirement and the resolutions. That is, the values of x, y and z are not limited to being chosen in a linear manner or in an exponential manner. Moreover, if interpolation is allowed in the system, the values x, y, and z of the sample periods can also be non-integers. However, generally, to increase the effective range of the depth information provided by the depth processing device 200 effectively without increasing the number of comparisons, the depth processing device 200 can determine the values x, y, and z of the sample periods according to the accuracy condition of the corresponding depth regions.

For example, the depth processing device 200 can divide the target blocks into a plurality of sets, and select the set of target block corresponding to the depth region requiring higher accuracy to be a predetermined set of target blocks, for example, the second set of target block TB_B may be selected. In the predetermined set of target blocks, a smaller sample period would be applied. Contrarily, in other sets of target block corresponding to the depth regions not requiring higher accuracy, such as the first set of target block TB_A and the third set of target block TB_C, greater sample periods would be applied.

Although in the aforementioned embodiments, the depth processing device 200 can divide the depth distribution of objects into three sections and use three different sample periods to select the target blocks, it is not to limit the scope of the present invention. In some other embodiments, the depth processing device 200 can also divide the depth distribution of objects into different numbers of sections. For example, the depth processing device 200 can further select target blocks with the sample period of 2 pixels for depth values between 15 and 30. That is, the depth processing device 200 can use four different sample periods for sampling.

Alternatively, the depth processing device 200 can change to select the target blocks with the sample period of 1 pixel for depth values between 0 and 50, and select the target blocks with the sample period of 2 pixels for depth values over 50. That is, the depth processing device 200 can use two different sample periods for sampling.

In other words, the depth processing device 200 can set a proper number of sections and the correspondent sample periods according to the practical conditions and the application requirements, ensuring that the effective range of the depth information provided by the depth processing device 200 can be increased within the permitted numbers of comparison.

In addition, when the depth processing device 200 selects target blocks with a small sample period, to prevent the depth processing device 200 from finding the local minimum and causing misjudgment, the depth processing device 200 can further include a low-pass filter 240 as shown in FIG. 3 to smooth the pixels in blocks. The low-pass filter 240 can filter high frequency signals in the reference block RB and the target blocks TB1 to TBq according to the sample period of the plurality of target blocks TB1 to TBq before comparing the plurality of target blocks TB1 to TBq with the reference block RB. In the aforementioned embodiments, the processor 230 can select the target blocks along the horizontal comparison direction A1. In this case, the low-pass filter 240 can also perform the low-pass filtering along the horizontal direction only.

Furthermore, in the aforementioned embodiments, the resolutions of the reference image IMGR and the target image IMGT are higher than the resolutions captured by the depth processing device 100. In this case, the depth processing device 200 may have to process the corresponding depth information of more pixels. However, in some embodiments, the hardware of the depth processing device 200 may limit the resolution of the depth information, that is, the depth processing device 200 is limited to generating depth information for a fixed number of pixels. In this case, the depth processing device 200 can also sample the pixels for depth calculation corresponding to the raised resolution. For example, the depth processing device 200 may only calculate the depth information for pixels in the odd columns or in the even columns. Consequently, the depth information generated by the depth processing device 200 will be corresponding to the same number of pixels and have the same resolution while the accuracy can be improved.

Figure 7:
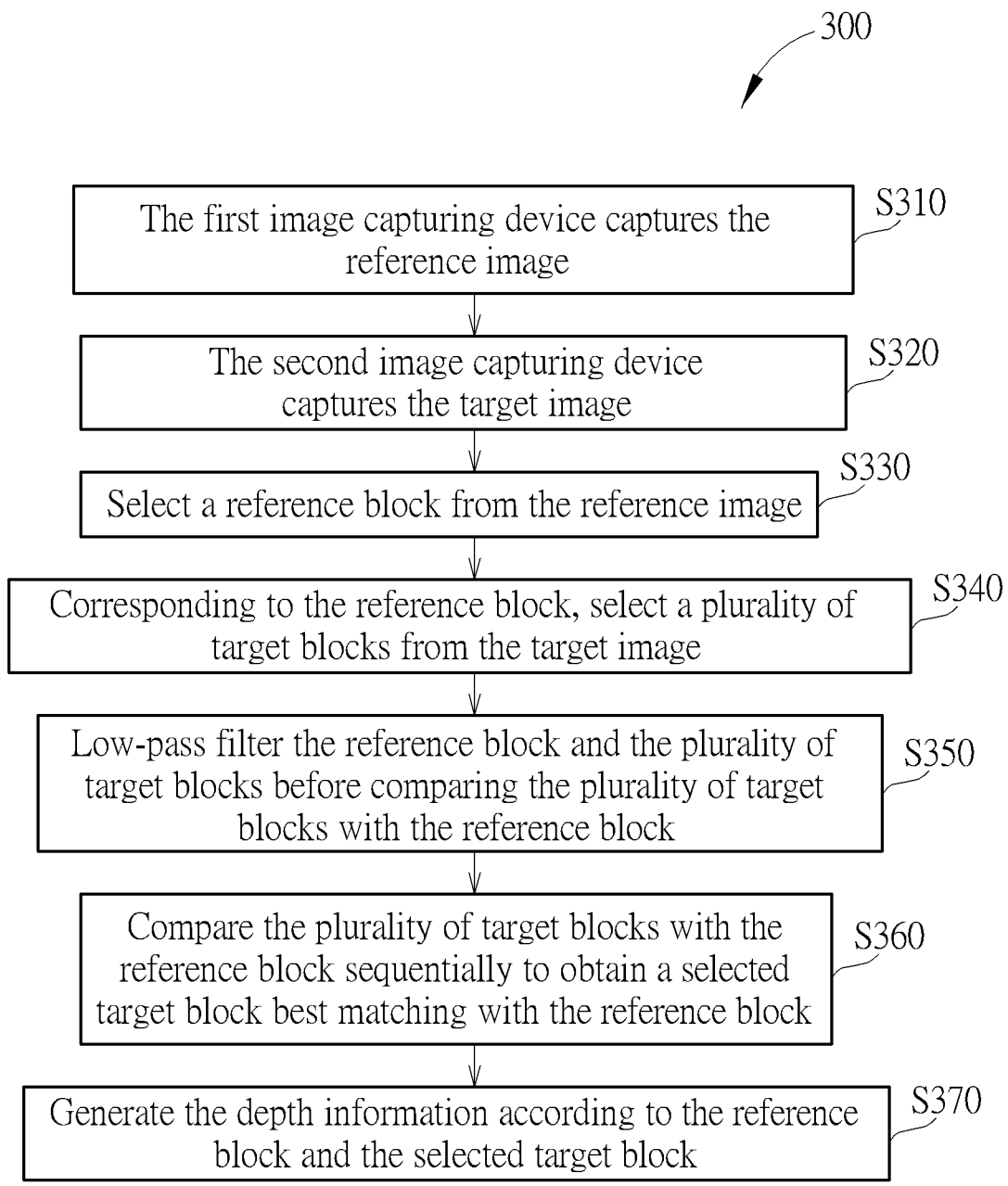
FIG. 7 shows a method for operating the depth processing device in FIG. 3 according to one embodiment of the present invention.

FIG. 7 shows a method 300 for operating the depth processing device 200 according to one embodiment of the present invention. The method 300 includes steps S310 to S370, but is not limited to the order shown in FIG. 7.

S310: the first image capturing device 210 captures the reference image IMGR;

S320: the second image capturing device 220 captures the target image IMGT;

S330: select a reference block RB from the reference image IMGR;

S340: corresponding to the reference block RB, select a plurality of target blocks TB1 to TBq from the target image IMGT;

S350: low-pass filter the reference block RB and the plurality of target blocks TB1 to TBq before comparing the plurality of target blocks TB1 to TBq with the reference block RB;

S360: compare the plurality of target blocks TB1 to TBq with the reference block RB sequentially to obtain a selected target block best matching with the reference block RB;

S370: generate the depth information according to the reference block RB and the selected target block.

After the reference image IMGR and the target image IMGT are captured in steps S310 and S320, the depth processing device 200 can select a reference block RB from the reference image IMGR in step S330 and select the corresponding target blocks TB1 to TBq in step S340. After the depth processing device 200 obtains the selected target block best matching with the reference block RB, the depth processing device 200 can derive the corresponding disparity according to the distance between the center pixel of the first target block TB1 and the center pixel of the selected target block. Then, in step S370, the depth information of the object represented by the center pixel of the reference block RB can be generated according to the disparity, and the relevant parameters of the first image capturing device 210 and the second image capturing device 220. In addition, in some embodiments, before step S360, the target blocks and the reference block are low-pass filtered before comparison in step S350.

In some embodiments, when selecting the target blocks, the depth processing device 200 can select the target blocks with different sample periods according to the correspondent depths and the error threshold allowed by the system so that the effective range of the depth information provided by the depth processing device 200 can be broadened, or the number of comparisons can be reduced while the accuracy remains acceptable.

For example, the target blocks selected by the depth processing device 200 can be as shown in FIG. 5. In FIG. 5, the target blocks TB1 to TBq can include a first set of target blocks TB_A, a second set of target blocks TB_B, and a third set of target blocks TB_C. In the first set of target blocks TB_A, the pixel step length between any two adjacent target blocks of the first target block TB1 to the $(n+1)^{th}$ target block TB(n+1) is x pixels. In the second set of target blocks TB_B, the pixel step length between any two adjacent target blocks of the $(n+2)^{th}$ target block TB(n+2) to the $(m+1)^{th}$ target block TB(m+1) is y pixels. Also, in the third set of target blocks TB_C, the pixel step length between any two adjacent target blocks of the $(m+2)^{th}$ target block TB(m+2) to the $q^{th}$ target block TBq is z pixels.

In the embodiment of FIG. 5, x can be 4, y can be 1, and z can be 2. Since the target blocks in the first set of target blocks TB_A are corresponding to objects with larger depth values, and thus, with larger errors, the depth processing device 200 cannot meet the required accuracy even with a smaller sample period. Therefore, a medium sample period can be used to select the first target block TB1 to the $(n+1)^{th}$ target block TB(n+1) in the first set of target block TB_A.

Also, the target blocks in the second set of target blocks TB_B are corresponding to objects with medium depth values, and thus, with errors probably near the acceptable error threshold. Therefore, the depth processing device 200 can use a smaller sample period to select the $(n+2)^{th}$ target block TB(n+2) to the $(m+1)^{th}$ target block TB(m+1) in the second set of target block TB_B for improving the accuracy.

Furthermore, the target blocks in the third set of target blocks TB_C are corresponding to objects with small depth values, and thus, with small errors. Therefore, the depth processing device 200 can use a greater sample period to select the $(m+2)^{th}$ target block TB (m+2) to the $q^{th}$ target block TBq in the third set of target block TB_C for relieving the system burden while keeping the accuracy acceptable.

With the method 300, the depth processing device 200 can use the proper sample periods corresponding the depths of the objects to select the target blocks according to the system requirement, allowing the depth processing device 200 to provide a wider effective range of depth information without increasing the number of comparison.

In summary, the depth processing devices and the methods for operating the depth processing devices provided by the embodiments of the present invention can use proper sample periods corresponding to the depths of objects to select the target blocks according to the corresponding depth regions so the accuracy of the depth information in some specific depth regions can be improved without increasing the number of comparisons, allowing the depth processing device to provide a wider effective range of depth information.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A depth information processing device comprising:
   a first image capturing device configured to capture a reference image;
   a second image capturing device configured to capture a target image; and
   a processor coupled to the first image capturing device and the second image capturing device, and configured to:
   select a reference block from the reference image;
   select a plurality of target blocks corresponding to the reference block from the target image with different sample periods; and
   generate the depth information according to the reference block and a selected target block of the plurality of target blocks.

2. The depth information processing device of claim 1, wherein the different sample periods are determined according to accuracy condition of corresponding depth regions.

3. The depth information processing device of claim 1, wherein in the plurality of target blocks, a sample period between two adjacent target blocks is different from a sample period between another two adjacent target blocks.

4. The depth information processing device of claim 1, wherein the reference block is corresponding to an object, the processor compares the plurality of target blocks with the reference block sequentially along a comparison direction to obtain the selected target block best matching with the reference block, generates a disparity of the object between the first image capturing device and the second image capturing device according to the reference block and the selected target block, and generates depth information of the object according to the disparity and a plurality of relevant parameters of the first image capturing device and the second image capturing device.

5. The depth information processing device of claim 1, further comprising a low-pass filter configured to filter the reference block and the plurality of target blocks according to sample periods of the plurality of target blocks before comparing the plurality of target blocks with the reference block.

6. A depth information processing device comprising:
   a first image capturing device configured to capture a reference image;
   a second image capturing device configured to capture a target image; and
   a processor coupled to the first image capturing device and the second image capturing device, and configured to:
   select a reference block from the reference image;
   select a plurality of target blocks corresponding to the reference block from the target image; and
   generate the depth information according to the reference block and a selected target block of the plurality of target blocks;
   wherein a first sample period of a first set of target blocks of the plurality of target blocks is different from a second sample period of a second set of target blocks of the plurality of target blocks.

7. The depth information processing device of claim 6, wherein the first sample period and the second sample period are determined according to accuracy condition of depth regions corresponding to the first set of target blocks and the second set of target blocks.

8. The depth information processing device of claim 6, wherein:
   a plurality of depth values corresponding to the first set of target blocks are smaller than a plurality of depth values corresponding to the second set of target blocks; and
   the first sample period is greater than the second sample period.

9. The depth information processing device of claim 8, wherein:
   a plurality of depth values corresponding to a third set of target blocks of the plurality of target blocks are smaller than the plurality of depth values corresponding to the second set of target blocks; and
   a third sample period of the third set of target blocks is greater than the second sample period.

10. The depth information processing device of claim 6, wherein:
    a plurality of depth values corresponding to the first set of target blocks are smaller than a plurality of depth values corresponding to the second set of target blocks; and
    the first sample period is smaller than the second sample period.

11. The depth information processing device of claim 6, wherein the reference block is corresponding to an object, the processor compares the plurality of target blocks with the reference block sequentially along a comparison direction to obtain the selected target block best matching with the reference block, generates a disparity of the object between the first image capturing device and the second image capturing device according to the reference block and the selected target block, and generates depth information of the object according to the disparity and a plurality of relevant parameters of the first image capturing device and the second image capturing device.

12. The depth information processing device of claim 6, further comprising a low-pass filter configured to filter the reference block and the plurality of target blocks according to sample periods of the plurality of target blocks before comparing the plurality of target blocks with the reference block.

13. A depth information processing device comprising:
    a first image capturing device configured to capture a reference image;
    a second image capturing device configured to capture a target image; and
    a processor coupled to the first image capturing device and the second image capturing device, and configured to:
    select a reference block from the reference image;
    select a plurality of target blocks corresponding to the reference block from the target image; and
    generate the depth information according to the reference block and a selected target block of the plurality of target blocks;
    wherein a sample period of a predetermined set of target blocks of the plurality of target blocks is smaller than sample periods of other sets of target blocks of the plurality of target blocks.

14. The depth information processing device of claim 13, wherein the sample period of the predetermined set of target blocks and the sample periods of the other sets of target blocks are determined according to accuracy condition of depth regions corresponding to the predetermined set of target blocks and the other sets of target blocks .

15. The depth information processing device of claim 13, wherein the reference block is corresponding to an object, the processor compares the plurality of target blocks with the reference block sequentially along a comparison direction to obtain the selected target block best matching with the reference block, generates a disparity of the object between the first image capturing device and the second image capturing device according to the reference block and the selected target block, and generates depth information of the object according to the disparity and a plurality of relevant parameters of the first image capturing device and the second image capturing device.

16. The depth information processing device of claim 13, further comprising a low-pass filter configured to filter the reference block and the plurality of target blocks according to sample periods of the plurality of target blocks before comparing the plurality of target blocks with the reference block.

\* \* \* \* \*